(No Model.) 2 Sheets—Sheet 1.
H. P. BROWN.
DYNAMO ELECTRIC MACHINE AND MOTOR.
No. 493,679. Patented Mar. 21, 1893.
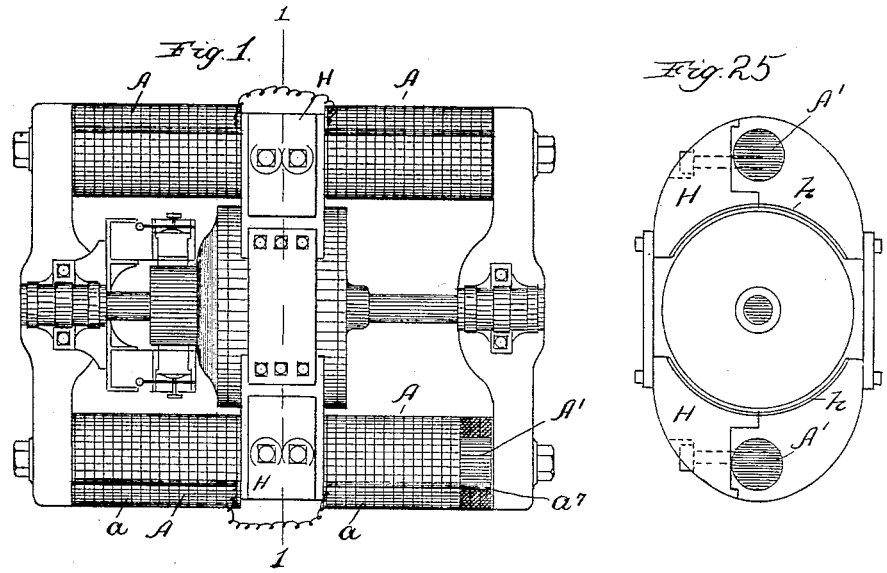
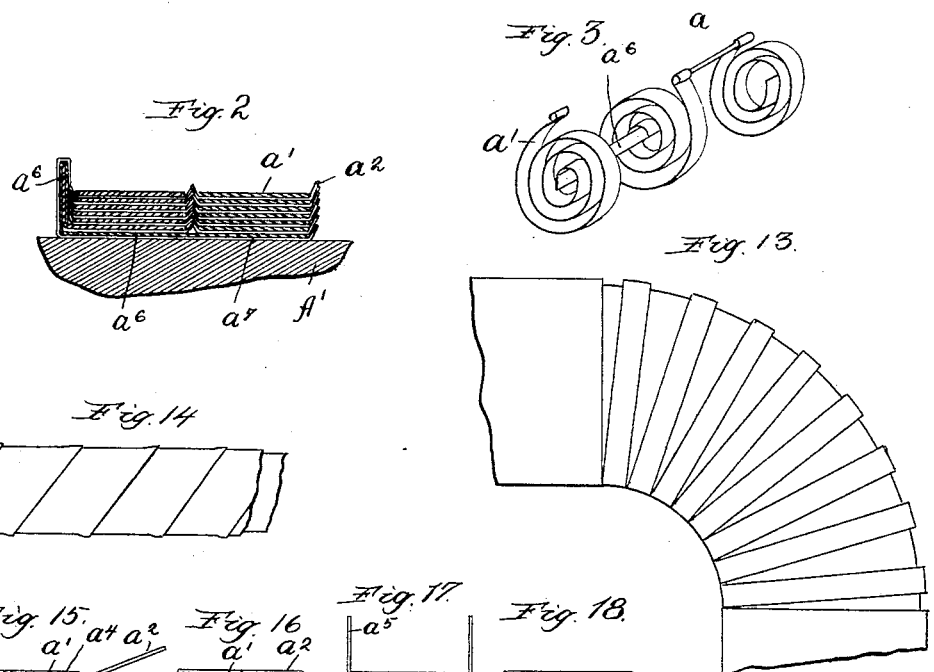
Witnesses:
Lew. E. Curtis
H. W. Munday
Inventor:
Harold P. Brown
By Munday, Evarts, & Adcock
His Attorneys

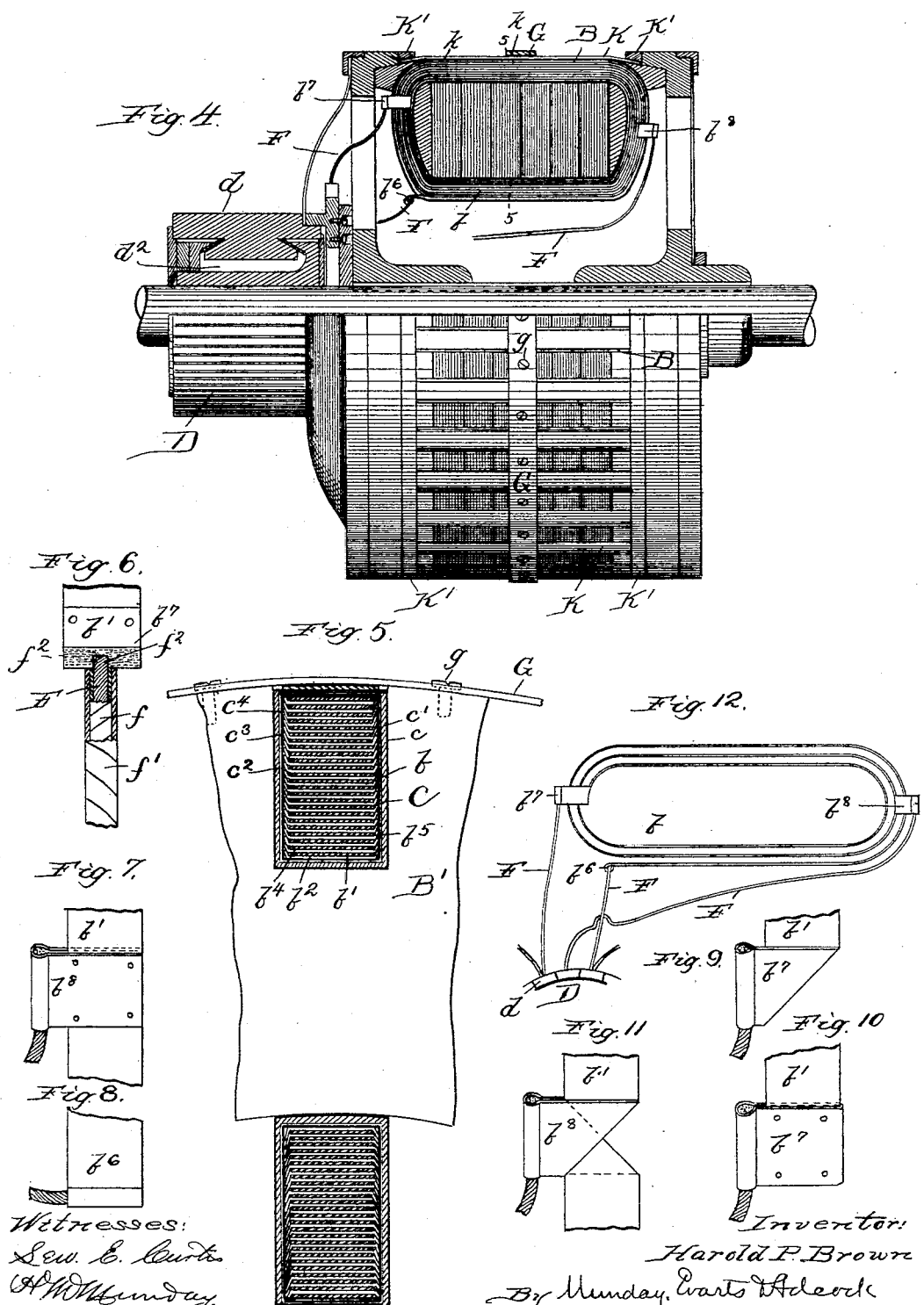

UNITED STATES PATENT OFFICE.

HAROLD P. BROWN, OF NEW YORK, N. Y.

DYNAMO-ELECTRIC MACHINE AND MOTOR.

SPECIFICATION forming part of Letters Patent No. 493,679, dated March 21, 1893.

Application filed December 10, 1891. Serial No. 414,566. (No model.)

*To all whom it may concern:*

Be it known that I, HAROLD P. BROWN, a citizen of the United States, residing at New York, in the county of New York and State of New York, have invented a new and useful Improvement in Dynamo-Electric Machines and Motors, of which the following is a specification.

My invention relates to improvements in dynamo electric machines and motors.

The object of my invention is to provide a dynamo electric machine or motor of a simple and efficient form wherein the magnet coils are of improved construction both mechanically and electrically and are completely enveloped or infolded in fire-proof and water-proof insulation of such character that extraordinary electric shocks to which the machine may be subjected will not cause the current to jump through or perforate the insulation, so that water or moisture will not injure the insulation and so that the magnet coils will not be in danger of injury from an excessive flow of current, while at the same time the insulation may be easily and conveniently applied as the magnet coils are formed.

Heretofore the magnets of dynamo-electric machines and motors have ordinarily been wound with round copper wire insulated with a winding or braid of cotton or silk. Occasionally the successive layers have been separated with paper or cloth. Sometimes as each layer of wire is completed, it is covered with oil or paint or with shellac dissolved in alcohol. In the latter case such magnets are afterward placed in an electric circuit or in an oven and heated until all moisture has been dried out, but it is evident that only a moderate degree of heat can be used without charring the fiber of the insulation and thus weakening or ruining it. The disadvantages pertaining to the use of round wire for these purposes are that a large amount of space is necessarily wasted between the turns of wire even though their edges touch; this is especially the case at the beginning and end of each layer; that one turn presents a line of contact to the contiguous turns and if too great pressure is used in winding, the insulation is easily cut; if, on the other hand, the layers are not tightly wound the wires are liable to move back and forth when the machine is in service until the insulation is worn through; and that two contiguous wires in a coil may have a great difference in electrical potential.

Heretofore fireproof insulation, such for example as mica or asbestos paper, has been employed in the construction of the magnet coils of dynamos or motors to insulate same from their iron cores, but the difficulty or objection which has been experienced in the use of such insulation arises from the great tendency and danger of the current's jumping through or perforating the insulation when the apparatus happens to sustain any extraordinary electric stress, especially so when subjected to moisture. This tendency or danger of the current's jumping through or perforating the insulation is not however experienced when non-fire-proof and water-proof insulation is employed, such for example as rubber, shellac or other gum like material, as the electric spark will jump through solid insulation much more readily than through a viscous insulation of less thickness. The difficulty with such insulation is that it is liable to be burned or destroyed when the apparatus is over-heated. It is especially important that the insulation should be fire-proof and water-proof when the machine is used as a railway-motor since it is frequently subjected to excessive loads and exposed to rain and snow.

I have discovered, and herein my invention in part consists, that by impregnating or saturating or coating the fire-proof insulating material, such for example as mica, spun glass or asbestus, with a gum-like insulating material, such as shellac, I am enabled to produce an insulating material which overcomes both the difficulties hereinbefore mentioned and which is at once fireproof, water-proof and not liable to perforation or jumping of the current through the same when under high tension or when the apparatus is subjected to electric shocks. Shellac gum is well adapted for this purpose especially when first dissolved in alcohol and afterward boiled or burned until the alcohol has evaporated. It is then best applied to the fireproof insulation while still hot, and the completed coil subjected to a high degree of heat.

In practically applying my fireproof and water-proof electrically imperforable insulating material in the construction of magnets for dynamos or motors, I form the magnet coils of flat metal tape, preferably copper, with edges filed, smoothed, rounded or beveled so as to avoid cutting the insulating material, and as the same is wound upon the armature or field magnet core I interpose between each separate layer of the metal tape and wind therewith a continuous strip or tape of my fireproof electrically imperforable insulating material sufficiently wider than the metal tape to allow the edges to be folded over and embrace the edges of the metal tape, so that each separate layer of the metal tape will be completely enveloped or infolded in insulating material, the latter being flexible so that it may be thus folded. As the separate coils of the metal tape are thus completely surrounded by the fire-proof electrically and water-proof imperforable insulating material, there is no opportunity for the current to pass or jump from one layer to another. The advantages of flat conducting tape over the round wire ordinarily used are as follows:—First. There is no space wasted by the tape in winding a coil as is the case with wire, and therefore a greater number of turns with the same conductivity, or the same number of turns with a greater conductivity, can be wound in a given space of rectangular cross section than is possible with wire. This brings the coils closer to the iron core and gives greater magnetic effect with same flow of current. Second. The tape presents a flat surface to the insulation between two of its layers, while the round wire when wound in layers, has mere lines of contact, between which lines the insulating material may be cut if the wire is wound too tightly or if it is pounded down in the process of winding; tape may therefore be placed under very heavy pressure in winding a coil, without injury to its insulation. Third. For the reason just given tape coils may be held more rigid mechanically than wire and are therefore not liable to injure the insulation by the slipping of one turn upon another; this frequently occurs with wire coils. Fourth. A discharge spark of electricity is more likely to occur between points or lines of conductors near to each other than between parallel surfaces; the insulation between two layers of a tape coil is therefore less liable to be punctured than that in a wire coil. Fifth. In a tape coil the difference of electrical potential between one layer and the next is merely the difference due to a single turn; in a wire coil having, for instance, eight turns in a layer, the first turn will be, in ordinary practice, next to the eighth turn of the second layer and the difference of potential will be that due to sixteen turns. There will be, therefore, much less danger of puncturing the insulation in a tape coil than in a wire coil and if such puncturing should occur the resulting destructive current will be much smaller with the former. Sixth. There is greater surface for radiation of heat with tape than with wire. Seventh. With the same number of turns of the same conductivity, there will be less self-induction in a tape coil than in a wire coil. For these reasons I use coils of conducting tape and place them preferably on a laminated toothed ring armature, proportioning the width of the tooth and of the coil and the thickness of the ring so that there will be on the inside of the ring, only sufficient room for the proper amount of insulation between the coils, thereby utilizing for the coils, the maximum amount of space on the periphery of ring. The teeth are allowed to project beyond the outer surface of the coils to protect them from mechanical injury and to secure them firmly in position as hereinafter described. The electrical advantages of a toothed ring armature are well understood. Its mechanical advantages, since I put but a single coil in each groove, are that each turn is firmly secured and its edge is wedged against a spool of insulation which it can neither cut nor compress. Therefore in a dynamo-electric machine, when power is applied to turn the armature in a magnetic field whose action is to check the movement of each coil through it, the active portion of each turn of every coil is forced to move with the toothed ring and cannot hang back, wear itself loose and destroy the insulation. And conversely in a motor when a coil is moved by the current, the toothed ring must move simultaneously. In all other dynamos and motors, all or nearly all of the turns of armature conductors in resisting movement or producing motion exert their force against a contiguous turn, thereby gradually injuring the insulation and acquiring a greater amount of lost motion to produce still greater injury. Therefore in my machine, each turn of active conductor in the armature is in the best possible condition, electrically and mechanically to do its work and withstand injury.

I am aware that heretofore toothed cylinder armatures have been used in which were placed rectangular copper bars or flat copper tape, one edge of said tape being on the periphery of the cylinder and its plane being approximately in line with center of the cylinder. In this form each layer must be a single piece and must have a conducting strip riveted or soldered on each end to connect with the succeeding layer on the opposite side of the cylinder. It is therefore difficult to construct and the numerous joints are disadvantageous in operation.

I am also aware that ring armatures have been used with occasional teeth between which two or more coils of flat tape were wound, the flat surface of the outer layer being on the periphery of the ring. As in this style of armature there is a wide space between the teeth, one edge of each turn of the tape is at certain points in each revolution of the armature cutting a greater number of magnetic lines of force than the other edge. This produces wasteful, heating currents between the edges of the tape and greatly reduces the efficiency of the machine. The mechanical disadvantage of this form is the fact that one coil in action must press against the tape edges in the next coil, thus endangering the insulation, and that band wires, which are liable to stretch and break, must be depended upon when the armature is in motion to resist the centrifugal force of the coils and the attraction of the field magnets exerted upon same. In my improved dynamo-electric machine, each armature coil rests in a groove of its own and is wound upon a spool of fire-proof and water-proof insulation. Each turn of copper tape covered with its adhering and wider fire proof insulation, which is preferably saturated with hot shellac at the time of winding, is forced into its groove, hammered down and wedged in place by the backward turning edges of the insulating tape which adhere to the sides of the spool. After baking, the coil is a rigid mass. As there is but one coil in a groove, the projecting teeth prevent unequal magnetic action upon the copper tape and wasteful local currents are thus avoided. I am aware that there have heretofore been used on the cores of dynamo field magnets, spools of water-proof insulation capable of withstanding a moderate degree of heat. These spools have, however, been wound with round wire covered with cotton insulation. The fire-proof and water-proof insulating spools which I use on my improved armature may be formed of successive layers of my insulating material built up in position, or they may be made in halves or with a single overlapping joint. The latter form may be used with a toothed cylinder armature, but in this case each coil, instead of lying in one plane, would describe a compound curve at each end of the cylinder to avoid the armature shaft and the other coils.

In connecting the coils to the commutator the ends of the copper tape may themselves be insulated and screwed, riveted or soldered to the corresponding commutator segments. The disadvantage encountered with this form of connection is that the vibration caused by the armature's motion is apt to crystallize the tape and gradually break it off. I therefore prefer to use a flexible conductor which may be composed of a number of wires twisted on themselves and suitably insulated. To prevent these connections from coming loose from the coil, I prefer to rivet a loop of tape on the inside end of the same at right angles to the tape in the coil, so that the looped end will project beyond the edge of the coil and through the insulating spool. The ends of the flexible wire cable are soldered into this loop, the ends projecting outward from the center of the armature so that in case the solder is melted, the cable will not fly out by its centrifugal force. The inner end of the tape may be folded on itself to produce this loop or its equivalent, but there is less danger of breakage by the method just described. The outer end of the coil is preferably located inside the ring armature and near the commutator. The tape is preferably bent back upon itself and riveted. A hole is punched in the center of the loop thus made and the ends of the flexible cable are thrust through the hole, bent into the form of a T and soldered in position. It is evident that the cable cannot leave its place even though the solder may melt out.

My invention further consists in the novel devices and novel combinations of parts and devices herein shown and described and more particularly pointed out in the claims.

In the accompanying drawings which form a part of this specification and in which similar letters of reference indicate like parts, Figure 1 is a plan view of an electric machine embodying my invention. Fig. 2 is a detail partial radial section showing the construction of the magnet coils in the field and their insulation. Fig. 3 is a detail diagram view showing the manner of connecting the field magnet coils. Fig. 4 is an enlarged view, partly in section, of the armature magnet. Fig. 5 is an enlarged cross section of the armature on the line 5—5 of Fig. 4. Fig. 6 is a detail view, partly in section, of the flexible terminal connection leading from the commutator to the armature coils, showing its construction and insulation. Figs. 7, 8, 9, 10 and 11 illustrate different manners of leading out the terminals from the armature coils. Fig. 12 is a diagram illustrating the manner of connecting up the armature coils with the commutator. Fig. 13 is a partial detail view of the armature ring showing the manner in which the rubber cloth foundation or vulcabeston spool is cut or formed at the curve or corner of the armature ring so as to properly turn the same. Fig. 14 illustrates a modification in which the insulation strip is wound spirally around the metal tape or strip. Fig. 15 shows the metal tape and the flexible fire-proof and waterproof electrically imperforable insulation tape in position ready for the latter to be folded over and around the former. Fig. 16 shows the same folded. Figs. 17 and 18 are similar views of a modification. Figs. 19 and 20 are similar views illustrating the form that I prefer to use and which is shown to be employed in the machine illustrated in the drawings. Figs. 21 and 22 are similar views of the modifications wherein the insulation is double in quantity. Figs. 23 and 24 are like views of still another modification. Fig. 25 is a cross-section on the line 1—1 of Fig. 1.

In the drawings A represents the field magnets of an electric dynamo or motor and B represents the armature magnets of the same. The pole pieces H have their lower portions cast upon the wrought iron core A', while their upper portions can be removed to take out the armature.

The field magnets $a$ are formed of metal tape $a'$, preferably copper, with edges smoothed, rounded or beveled, and wound spirally around the field magnet core A' in conjunction with a somewhat wider tape $a^2$ of fire proof and water proof electrically imperforable insulating material, preferably composed of asbestos fiber, cloth or paper, or mica, spun glass or other insulation having a high melting point, coated, saturated or impregnated with shellac or other gum $a^4$. The overlapping edges $a^5$ of the fire-proof insulating tape are turned or folded up, over or around the edges of the metal tape $a'$, so that each separate layer of the metal tape is completely surrounded or enveloped by the insulating material. The insulating material at the time of winding is of a flexible nature so as to adapt its overlapping edges to be thus folded.

The field magnet A, as is clearly indicated in Figs. 1, 2 and 3, is composed of a series of adjacent spiral coils of metallic tape and insulating tape. The folded overlapping edges of the insulating tape of two adjacent spiral coils, form or constitute an insulating wall between them which may be reinforced when necessary. This is clearly shown in Fig. 2. The inner ends of two adjacent spirals are connected together and the outer ends of the next two adjacent spirals are connected, and so on, as clearly illustrated in Fig. 3. The connections $a^6$ between two adjacent spirals may consist of an integral portion of the metal tape or of separate metal strips of flexible wires securely soldered or riveted to the adjacent ends of the spirals to be united. The coils or spirals $a\ a$ are all insulated from the core and pole pieces of the field magnet by a spool of insulating material $a^7$ interposed between. Each coil may also be wound upon a separate spool of insulating material through which its inner terminal projects. Each coil $b$ of the armature is likewise composed of a metal tape $b'$ preferably of copper wound around the armature ring B' with an interposed wider fire-proof and water-proof imperforable insulating tape $b^2$ composed preferably of asbestos fiber, cloth or paper coated, impregnated or saturated with burnt shellac or other viscous material $b^4$, the overlapping edges $b^5$ of the insulating tape being turned or folded up, over or around the edges of the metal tape so as to completely surround or envelop the same and thus prevent all possibility of the current passing or jumping from one turn or layer to another. The armature coil or spiral $b$ as a whole is insulated from the armature ring B' at the bottom and sides of the notch therein by an insulating spool C made in halves or one overlapping piece and consisting preferably of vulcanized asbestus or of its equivalent, or it may be built up of an outside layer of rubber cloth $c$, one or more layers of asbestus paper $c'$ each impregnated or coated with burnt shellac $c^2$, one layer of mica $c^3$ and an inside layer of rubber cloth $c^4$, the outer and inner layers of rubber cloth serving to bind the intermediate layers together, to mechanically protect the asbestus during the winding of the core and give strength and form to the spool, while the burnt shellac serves not only as a water-proof insulation but also to cause all the parts to adhere together.

The overlapping edges $b^5$ of the insulating tape $b^2$ are preferably just wide enough to completely cover and envelop or embrace and adequately protect or insulate the metal tape $b'$ at the sides thereof, as is clearly indicated in Figs. 5, 19 and 20; as when thus constructed the mere act of winding the succeeding coil or layer of the metal tape $b'$ with or upon the immediately lower layer or coil of insulating tape $b^2$ serves to fold or turn up properly the overlapping edges of said insulating tape, and the winding or forming of the coils is thus facilitated. If desired however, the insulating tape $b^2$ may be made still wider so that its overlapping edges $b^5$ will completely envelop in itself alone the metal tape $b'$, as shown in Figs. 15 and 16, and thus form two thicknesses of insulating tape between each two successive layers or turns. If it is desired to still further increase the number of layers of insulating tape between two successive coils or layers, this may be conveniently done in the manner indicated in Figs. 71 and 18.

The modifications indicated in Figs. 21 and 22 and in Figs. 23 and 24 will be readily understood by those skilled in the art. The insulating tape is preferably affixed to the conducting tape in a continuous roll long enough to form one bobbin. Boiled or burnt shellac or other suitable gum is used to fasten the two together and the same is applied to the coil as it is wound. In winding it is preferred that the insulating tape should be on the inside so as to prevent stretching or cracking it on the curved portions of coil. After winding a coil in this way the metal may be heated to redness without injuring the insulation, as the residue of the shellac is still a good insulator.

D represents the commutator and $d$ the segments thereof. I prefer to fill the space $d^2$ below the commutator segments, with burnt shellac or other viscous material to protect the insulation between the said segments.

F are flexible wire leads connecting the inner and outer terminals and the loop or intermediate terminals of the coils $b$ with the commutator segments. These are made flexible to prevent their being broken by the jar of the machine while in motion. These flexible wire leads F are insulated preferably with spiral wrappings $f$ of fireproof material, preferably asbestos paper and burnt shellac, and an outer protecting water proof insulation $f'$. These flexible wire leads may be secured to the copper tape terminals of the coil $b$ by soldering or riveting or both, and the joint is heavily insulated with fire-proof material and burnt shellac. A cross or T $f^2$ may be formed on the end of the flexible wire lead F, as indicated in Fig. 6 to facilitate its union with the copper tape terminals of the coil $b$, so that even though excessive heat may melt the solder, the joint is still mechanically strong. Each coil $b'$ has an inner copper tape terminal $b^7$ which is brought to the outside of the coil as indicated in Fig. 12, and connected to one of the leads F. Each coil also has an outer terminal $b^6$ which is likewise connected to one of the segments of the commutator by a flexible wire lead F. Each coil may also have an intermediate or loop terminal $b^8$ which is brought from about the middle of the coil to the outside and connected to one of the flexible wire leads F. The end terminals $b^6$ and $b^7$ may be formed integral with the copper tape $b'$ or with separate strips securely united thereto by soldering, riveting or by both, or otherwise. Different forms of the end terminals are indicated in Figs. 8, 9 and 10. The loop or intermediate terminal $b^8$ may likewise be formed of separate strips of metal soldered or riveted to the copper tape $b'$ as indicated in Fig. 7 or it may be formed integral with the tape itself by making a fold therein as indicated in Fig. 11, or in any other suitable manner. The inner and intermediate terminals $b^7$ and $b^8$ are preferably brought through holes in the spool C at the ends of the ring armature in the triangular space between the coils, so that the metal of said terminals may be perfectly insulated from the succeeding turns of tape in the coil. In order that only one terminal may occupy such triangular space, $b^7$ is on commutator end of armature and $b^8$ on opposite end.

To prevent any tendency of the flat tape coil $b$ from springing or bulging outward at the middle thereof under centrifugal action of the revolving armature, I provide the armature in place of band-wires which are liable to stretch and break, with an encircling band G which may preferably be made in segments and secured in place by screws $g$ which enter the armature ring; these are soldered to G to prevent their coming loose. I make this band in segments, preferably about eight segments, so that any particular armature coil may be removed without the necessity of removing the whole band G. In order to give ample space between pole-pieces H and the bands G and screws $g$, I cut a groove $h$ on inner surface of said pole pieces, as shown in Fig. 25. To facilitate the removal of the armature the bolts may be taken out and upper portions of H lifted off. To protect the face of the coils $b$ from injury when the armature is taken out or laid down or is being handled, I cover the face of each armature coil $b$ with a thin protecting plate K which extends across the armature lengthwise of the coil. These protecting plates K are held in place at each end by rings K' K' and at the middle by the band G. They are insulated from the coils by insulating strips $k$ and also from the band G and rings K'. The bands G and plates K may of course be used on armatures whose conductors are round in cross section.

After the armature has been wound in the manner hereinbefore described with the alternate metallic tape $b'$ and insulating tape $b^2$ coated with boiled or burnt shellac $b^4$, I place the armature in an oven or pass a heavy current through it and bake it, thus causing all the layers of the coils to adhere or unite together and thus form mechanically a perfectly solid and rigid structure as a whole, of great strength and firmness. This materially adds to the durability and efficiency of the device.

I use the word "electrically imperforable" in this specification to indicate the quality or characteristic that my fire-proof and waterproof insulating tape has to resist the tendency of a current of very high intensity to jump or pass through and perforate an ordinary non-viscous fire-proof insulating material, such for example as mica or asbestus paper. This characteristic is given to my insulating tape by the burnt shellac or other gummy insulation, which may be rubber, gutta-percha, the residue of coal tar or petroleum distillation, or other viscous insulating material.

I claim—

1. In a dynamo electric machine an armature with coils composed of flat conducting tape, each turn or layer being insulated with fire proof and water proof elastic, non-frangible electrically imperforable material composed of asbestus paper or its equivalent coated or impregnated with burnt shellac, substantially as specified.

2. In a dynamo electric machine a toothed armature with coils composed of flat conducting tape insulated with a tape of fire proof and moisture proof elastic, non-frangible electrically imperforable material composed of asbestus paper or its equivalent coated or impregnated with burnt shellac, substantially as specified.

3. A toothed armature having in each space between the teeth a single magnet coil composed of flat conducting tape insulated with a tape of insulating material capable of withstanding moisture and of resisting a high degree of heat, composed of asbestus paper or its equivalent, coated or impregnated with burnt shellac substantially as specified.

4. A fire proof magnet coil composed of alternate layers or turns of metal tape and fire proof insulating tape wound together, the insulating tape being wider than the metal tape and having its overlapping edges turned or folded over or around the edges of the metal tape, substantially as specified.

5. A magnet coil composed of alternate layers or turns of metal tape and of a tape of insulating material capable of withstanding moisture and of resisting a high degree of heat, composed of asbestus paper or its equivalent, coated or impregnated with burnt shellac substantially as specified.

6. A magnet coil composed of a spiral of metal tape whose edges are smoothed, rounded or beveled, and a spiral of insulating tape, wound together so as to insulate each layer of metal tape, said insulating tape being composed of asbestus paper or its equivalent coated or impregnated with burnt shellac substantially as specified.

7. A magnet coil composed of metal tape whose edges are smoothed, rounded or beveled, and insulating tape of a material capable of withstanding moisture and resisting a high degree of heat, said insulating tape being composed of asbestus paper or its equivalent coated or impregnated with burnt shellac substantially as specified.

8. An armature having two or more coils composed of alternate layers or turns of metal tape and of fire proof and water proof insulating tape, the terminals of said magnets being connected to their respective commutator segments by flexible connections, said insulating tape being composed of asbestus paper or its equivalent coated or impregnated with burnt shellac substantially as specified.

9. A magnet coil composed of alternate layers of metal tape and of a fire and water proof insulating tape, said coil being provided with flexible terminals, said insulating tape being composed of asbestus paper or its equivalent coated or impregnated with burnt shellac substantially as specified.

10. An armature having coils composed of metal tape with a fire proof insulation, and having flexible metallic terminals provided with fire proof insulation, said fireproof insulation for the tape and terminals being elastic and composed of asbestus paper, or its equivalent coated or impregnated with burnt shellac substantially as specified.

11. A magnet coil consisting of a spool of fire proof and water proof insulating material, such as vulcanized asbestus, a spiral of metal tape and a spiral of fire proof and water proof insulating tape, such as asbestus coated or impregnated with shellac or other viscous material, said metal and insulating tape being bound together around said spool so as to insulate each layer of the metal tape, substantially as specified.

12. In a dynamo electric machine, an armature consisting of a laminated magnetic core, and two or more spools of heat proof and moisture proof insulation inclosing said core, said spools being wound with a spiral of metal tape and a spiral of heat proof and moisture proof insulating tape so as to insulate each layer of the metal tape, said insulating tape being composed of asbestus paper or its equivalent coated or impregnated with burnt shellac substantially as specified.

13. The fire proof electrically imperforable insulating material composed of fire proof material as asbestus, and of a gummy electrically imperforable material as shellac, substantially as specified.

14. In an electric machine a magnet having the coils thereof insulated by an interposed fire proof electrically imperforable material, consisting of mica, spun glass or asbestus paper or fiber coated or impregnated with shellac or other viscous material, substantially as specified.

15. An electric machine comprising field magnets, the coils whereof are composed of flat metal tape wound with an interposed fire proof insulating tape, and an armature the coils whereof are likewise composed of flat metal tape wound with an interposed fire proof insulating tape, said insulating tape being composed of asbestus paper or its equivalent coated or impregnated with burnt shellac substantially as specified.

16. An electric machine comprising field magnets with coils composed of flat metal tape wound with an interposed heat proof and moisture proof insulating tape, and an armature the coils whereof are likewise composed of flat metal tape wound with an interposed heat proof and moisture proof insulating tape, said insulating tape being composed of asbestus paper or its equivalent coated or impregnated with burnt shellac substantially as specified.

17. In an electric machine a field magnet coil composed of metal tape wound with interposed insulating tape, composed of asbestus paper or its equivalent coated or impregnated with burnt shellac substantially as specified.

18. The field magnet coil composed of metal tape wound with interposed fire proof insulating tape, the insulating tape being wider than the metal tape and its overlapping edges being turned or folded over or around the edges of the metal tape, substantially as specified.

19. In an electric machine, a field magnet composed of coils of metal tape wound with interposed fire proof and water proof insulating tape, said coils being wound upon spools of fire and water proof insulating material, said insulating tape being composed of asbestus paper or its equivalent coated or impregnated with burnt shellac substantially as specified.

20. In an electric machine a field magnet composed of coils of metal tape wound with interposed insulating tape, said coils being provided with flexible terminals, said insulating tape being composed of asbestus paper or its equivalent coated or impregnated with burnt shellac substantially as specified.

21. The toothed armature whose magnets consist of coils of metal tape and an interposed insulating tape, and whose teeth project beyond the outer layers of said coils, said insulating tape being composed of asbestus paper or its equivalent coated or impregnated with burnt shellac substantially as specified.

22. The armature the coils whereof consist of a coil of metal tape and an interposed insulating tape, in combination with a sectional band G for holding the tape coils in place, substantially as specified.

23. The combination with an armature having coils composed of metal tape of protecting plates or bars K for covering the same, substantially as specified.

24. The combination with an armature having coils composed of metal tape of projecting plates or bars K for covering the same, rings K' K' for holding said plates in place, substantially as specified.

25. The armature provided with a band G composed of a number of separate segments independently secured by screws for holding the coils thereof in place, substantially as specified.

26. The armature provided with plates K covering the coils for protecting the same from injury, substantially as specified.

27. The armature provided with plates K covering the coils for protecting the same from injury, and holding rings K' K' for holding said plates in place, substantially as specified.

28. The combination with an armature of magnet coils provided with protecting plates K, retaining band G screwed or otherwise fastened to the armature, and rings K' K' for holding said plates and coils in place, substantially as specified.

29. The combination with an armature having coils consisting of metal tape, of flexible metal leads connecting the terminals of said tape coils with the commutator, substantially as specified.

30. The armature ring furnished with insulating spools C and provided with coils formed of flat metal tape $b'$ and interposed fire proof imperforable insulating tape $b^2$ composed of asbestus paper and shellac $b^4$, substantially as specified.

31. The armature ring furnished with insulating spools C, and provided with coils formed of flat metal tape $b'$ and interposed fire proof imperforable insulating tape $b^2$ composed of asbestus paper and burnt shellac $b^4$, said insulating tape $b^2$ being wider than said metal tape and its overlapping edges being turned or folded over the edges of said metal tape, substantially as specified.

32. The armature ring furnished with insulating spools C and provided with coils formed of flat metal tape $b'$ and interposed fire proof imperforable insulating tape $b^2$ composed of asbestus paper and burnt shellac $b^4$, said insulating tape $b^2$ being wider than said metal tape and its overlapping edges being turned or folded over the edges of said metal tape, and flexible wire leads F connecting said coils with segments of the commutator, substantially as specified.

33. The armature ring furnished with metal tape coils $b$ one in each notch of said ring, said coils each having an inner and outer terminal and an intermediate loop terminal connected by round flexible wire leads with commutator segments, substantially as shown and described.

34. A dynamo electric machine, the armature coils whereof are secured in place by the retaining band G screwed to projecting teeth or lugs on the armature, in combination with a groove cut in the field magnet, pole pieces to give proper clearance to said band and screw heads, substantially as specified.

35. An armature with coils composed of alternate layers of turns of metal tape and of a tape of insulating material, metal leads connecting said coils to their respective commutator segments and a recess below said segments filled with burnt shellac or other lubricant, substantially as specified.

36. A magnet coil composed of metal tape insulated with fire-proof and water-proof tape, said coil being wound upon a spool built up of successive layers of fire-proof material such as asbestus and mica, fastened together with a water-proof material, as shellac, and provided with an outer layer, such as rubber cloth capable of withstanding the mechanical abrasion of the process of winding said metal tape, substantially as specified.

HAROLD P. BROWN.

Witnesses:
H. M. MUNDAY,
EDMUND ADCOCK.